United States Patent [19] [11] 3,880,898
Knifton [45] Apr. 29, 1975

[54] PROCESS FOR PREPARING HALOGENIDES OF CARBOXYLIC ACIDS
[75] Inventor: John F. Knifton, Poughquag, N.Y.
[73] Assignee: Texaco Inc., New York, N.Y.
[22] Filed: Aug. 3, 1973
[21] Appl. No.: 385,530

[52] U.S. Cl. ................................................. 260/408
[51] Int. Cl. .............................................. C09f 7/00
[58] Field of Search ........................ 260/408, 544 A

[56] References Cited
UNITED STATES PATENTS
3,691,043  9/1973  Thaler ................................. 260/408
3,700,706  10/1972  Butter ................................. 260/408

Primary Examiner—Elbert L. Roberts
Attorney, Agent, or Firm—T. H. Whaley; C. G. Ries; Bernard Marlowe

[57] ABSTRACT

This invention concerns a process for preparing the acid halides of carboxylic acids (alternatively referred to as alkanoyl halides or acyl halides) by the addition of carbon monoxide and hydrogen halides to alkenes catalyzed by homogeneous noble metal halides in combination with Group IVB halide co-catalysts.

8 Claims, No Drawings

PROCESS FOR PREPARING HALOGENIDES OF CARBOXYLIC ACIDS

This invention relates to the catalytic addition of carbon monoxide and hydrogen halides to alkenes to produce alkanoyl (acyl) halides.

More particularly, this invention concerns the formation of alkanoyl (acyl) halides from the reaction of alkenes, carbon monoxide and hydrogen halides, catalyzed by homogeneous noble metal halides in combination with Group IVB metal halide co-catalysts.

BACKGROUND OF THE INVENTION

The acyl halides or alkanoyl halides as defined throughout this disclosure refers to compounds of the formula:

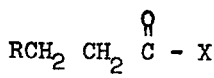

wherein R is selected from the group consisting of hydrogen and alkyl radials containing from 1 to about 40 carbon atoms and X is a halogen atom selected from the group consisting of chlorine, bromine and iodine.

The acyl halides as typified by the acyl chlorides, the most active and least costly members of the class, are valuable and widely used reagents in organic chemistry because they possess a highly reactive and labile chlorine atom that is generally more reactive than those of the alkyl chlorides. Because of this it takes part in a large number of metathetical reactions which introduce the acyl radical RCO. into a large number of compounds. For example, the acyl chlorides react with ammonia or amines to form amides, with alcohols to form esters, with the salts of acids to form anhydrides.

The acyl or acid chlorides of fatty acids can be prepared by a large number of general and classical methods. For example, the "acid chlorides" can be prepared from the corresponding carboxylic acid with phosphorus trichloride, phosphorus pentachloride, thionyl chloride ($SOCl_2$) and sulfuryl chloride ($SO_2Cl_2$). In addition, a number of more specific catalytic methods have been more recently disclosed.

CATALYTIC PROCESSES FOR PREPARING ACID HALIDES

While no attempt has been made to search the Patent and or Technical literature, it is noted that the patent to Alderson et al. (U.S. Pat. No. 3,065,242) discloses the preparation of acyl halides which comprises reacting at 50°C to 250°C and at pressures of up to 3000 atm, a mono-olefinic and dienic hydrocarbon of up to 20 carbon atoms, whose sole aliphatic unsaturation is 1–2 ethylenic bonds, with carbon monoxide, a hydrogen halide and a catalyst consisting of chelates, halides and carbonyls of Group VIII Noble metals. Applicant's process differs in that milder pressures and temperatures are employed and a different class of homogenous palladium or platinum catalyst are utilized. A second catalytic process by N. V. Kutepow et al. discloses a process for the preparation of branched acyl halides, such as butene-2-carboxylic acid chloride prepared by contacting butadiene with carbon monoxide plus hydrogen chloride in the presence of bis(triphenyl phosphine)palladium (II) chloride. The applicant's process differs in that using a different class of homogeneous palladium or platinum catalyst assures the formation of predominantly linear acyl halides when 1-alkenes are the chosen substrate. These two references are believed to be the closest prior art.

In the broadest practice of the inventive process, alkenes (olefins) are converted predominantly to the alkanoyl (acyl) halides possessing one more carbon atom than in the alkene substrate by the process of:

a. admixing each mole of alkene to be tranformed to alkanoyl halide with at least a stoichiometric quantity of hydrogen halide reactant(s), a catalytic quantity of a component homogeneous noble metal halide catalyst composition consisting essentially of a noble metal halide selected from the group consisting of palladium(II)-halides, platinum(II)halides and platinum(IV)halides, combined with a Group IVB metal halide cocatalyst, said catalyst being solubilized in a halogenated paraffinic solvent, in a deoxygenated environment, until a deoxygenated reaction mixture is formed, and b. heating said deoxygenated reaction mixture between about 20° and 120°C, while said mixture is under superatmospheric pressure by at least stoichiometric quantities of carbon monoxide, until said acyl halides are produced.

In order to present the inventive concept in the greatest possible detail, the following supplementary disclosure is submitted A. Process Sequence and Variations. In general, there is no criticality in adding the components of the reaction mixture comprising inert halogenated solvent(s), hydrogen halides, alkene (olefin), homogeneous noble-metal catalyst and carbon monoxide. Any sequence may be used as long as vigorous agitation is employed and pressurizing by carbon monoxide is the last step. For example the following represent some alternative variations that are acceptable.

1. The catalyst may be preformed and added to the halogenated solvent of the agitated reaction mixture. The nucleophilic reagent, a hydrogen halide, preferably hydrogen chloride may be added prior, or subsequent to, the addition of the noble metal catalyst.

2. Preferably to minimize stability problems caused by the catalyst's sensitivy to oxygen and/or oxidizing agents, the catalyst is formed in situ under an inert gas or hydrogen chloride purge or blanket. In the case of acyl chloride synthesis, this is done by adding the noble metal halide and the Group IVB metal halide to the mixture.

3. After using variation 1 or 2 the agitated catalyst solution containing halogenated solvent and hydrogen halide, has alkene substrate added, is pressurized with carbon monoxide and heated to the desired temperature range until the acyl halide product is formed.

B. Homogeneous Noble Metal Catalyst - The two or three component homogeneous catalyst of this invention consists essentially of: 1) a noble metal halide salt selected from the group consisting of a palladium(II), platinum(II) or platinum(IV) metal halide salt, 2) in combination with a Group IVB metal halide co-catalyst. Preferably the noble metal halide salt, typified by palladium(II) and platinum(II) metal halide salts, is stabilized by, 3) with one or more Group VB donor ligands which are believed to form stable complexes with the first two components. These donor ligands may contain one or more atoms selected from Group VB of the Periodic Chart of the Elements (Advanced Inorganic Chemistry, by F. A. Cotton and G. Wilkinson, 2nd Ed. 1966), preferably they contain one or more trivalent phosphorus or arsenic atoms, and are bonded to hydrocarbyl radicals such as saturated aliphatic, aromatic, alkylated aromatic and alkoxylated aromatic hydrocarbyl radicals.

Illustrative of suitable Group VB donor ligands which may be used in combination with the noble metal halide and the Group IVB metal halide to form active carbonylation catalysts for the preparation of alkanoyl (acyl) halides are: $P(C_6H_5)_3$, $As(C_6H_5)_3$, $P(p-CH_3O.C_6H_4)_3$, $P(p-CH_3.C_6H_4)_3$, $P(C_6H_{11})_3$, and $P(C_2H_5)_2(C_6H_5)$.

The Group IVB metal halides that may be used as co-catalysts in this invention include the halides of tin(II), tin(IV) and germanium(II). Illustrative examples include tin(II) chloride, tin(IV) chloride, tin(II) bromide, germanium(II) chloride and the like.

Illustrative of the homogeneous noble metal catalysts used for the synthesis of alkanoyl halides of this invention are the following:

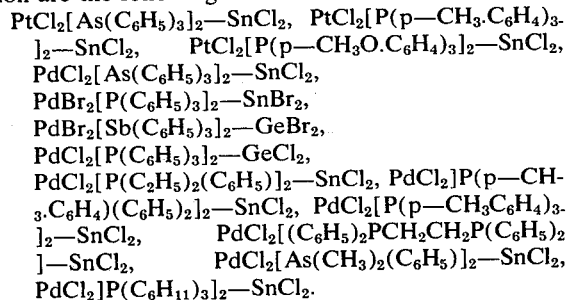

$PtCl_2[As(C_6H_5)_3]_2$—$SnCl_2$, $PtCl_2[P(p$—$CH_3.C_6H_4)_3$-$]_2$—$SnCl_2$,    $PtCl_2[P(p$—$CH_3O.C_6H_4)_3]_2$—$SnCl_2$,
$PdCl_2[As(C_6H_5)_3]_2$—$SnCl_2$,
$PdBr_2[P(C_6H_5)_3]_2$—$SnBr_2$,
$PdBr_2[Sb(C_6H_5)_3]_2$—$GeBr_2$,
$PdCl_2[P(C_6H_5)_3]_2$—$GeCl_2$,
$PdCl_2[P(C_2H_5)_2(C_6H_5)]_2$—$SnCl_2$, $PdCl_2]P(p$—$CH_3.C_6H_4)(C_6H_5)_2]_2$—$SnCl_2$, $PdCl_2[P(p$—$CH_3C_6H_4)_3$-$]_2$—$SnCl_2$,    $PdCl_2[(C_6H_5)_2PCH_2CH_2P(C_6H_5)_2$]—$SnCl_2$,    $PdCl_2[As(CH_3)_2(C_6H_5)]_2$—$SnCl_2$, $PdCl_2]P(C_6H_{11})_3]_2$—$SnCl_2$.

One convenient mode of preparation of the homogeneous ligand-stabilized noble metal halide-Group IVB metal halide catalyst complexes is typified by the in situ preparation of ligand stabilized platinum(II)* or palladium(II) halide-tin(II) halide complexes such as $PdCl_2[P(C_6H_5)_3]_2$—$SnCl_2$.

*See for example R. D. Cramer et al., J.A.Chem.Soc., 85, 1691 (1963) among others. These classes of catalytic entities are prepared according to or analogous to the method used to prepare $PdCl_2[P(C_6H_5)_3]_2$, and are then mixed with a large molar excess of the Group IVB metal halide, such as $SnCl_2$.

C. Ratio of Homogeneous Noble Metal Catalyst to Alkene (Olefin) Substrate - Experimental work indicates that a molar ratio of up to 500 moles to 1000 moles of alkenes per mole of homogeneous noble metal catalyst complex can be employed in most instances where alkene typified by 1-heptene is used as the substrate. Much lower ratios (i.e. 25 moles of alkene substrate per mole of noble metal halide) are not harmful but are economically unattractive. For this reason the preferred molar range arrived at in Table II ranges from 50 to 200 moles of alkene per mole of homogeneous noble metal catalyst complex.

D. Temperature Required for Producing Acyl Halide — The temperature range which can be employed is variable dependent upon other experimental factors including the alkene employed, the pressure, the concentration and the particular choice of palladium or platinum catalyst among other thangs. Again using 1-heptene as a typical alkene substrate and $PdCl_2[P(C_6H_5)_3]_2$—$SnCl$ as a representative catalyst, the range of operability is at least from 20 to 120°C when super-atmospheric pressures of 3000 psig are employed. A narrower range of 60°C to 100°C represents the preferred temperature range when the aforementioned alkene is reacted at 3000 psig using the catalyst system described supra. Table I is evidenciary of how this narrower range is derived.

E. Pressure - Superatmospheric pressures of at least 100 psig are required for substantial conversion of the substrate to the acyl halide at temperatures of 20° to 120°C using $PdCl_2[P(C_6H_5)_3]_2$—$SnCl_2$ or $PdCl_2[P(p$—$CH_3.C_6H_4)_3]_2$—$SnCl_2$ as catalyst and 1 heptene as the alkene. Table I provides the supporting experimental data which establishes the pressure range of 100 to 3000 psig, with the narrower range of 1000 to 3000 psig being preferred.

F. Reaction Times Required - As previously indicated in the analogous discussion on temperatures and pressures required in the reaction, experimental variables are important in arriving at reaction times. Generally substantial conversions (70% or higher) of the alkene such as heptene to the acyl halide (octanoyl chloride) can almost always be accomplished within 10 hours with 4 to 6 hours representing the more usual reaction time interval.

G. Alkenes (Olefins) as Substrates - Alkenes ranging in carbon content from 2 up to 40 carbon atoms can be employed. Illustrative alkene substrates include the preferred 1-alkenes (alpha-olefins) such as 1-propene, 1-butene, 1-pentene, 1-hexene, 1-octene, 1-nonene, 1-decene, 1-undecene, 1-dodecene, 1-tetradecene as well as their higher homologues such as 1-heptadecene, 1-octadecene, 1-eicosene, etc. These substrates may be utilized neat or in conjunction with one or more inert background solvents such as the saturated paraffins including pentanes, hexanes, heptanes, octanes and the like. The substrates can be in the form of single, discrete compounds or in the form of mixtures. In the latter case these substrates comprise mixtures of $C_3$ to $C_{40}$ carbon containing olefins. Usually these mixtures have a spread of from 4 to 8 carbon atoms. Because of their relatively low cost, mixtures of alpha olefins ranging in carbon content from $C_5$ to $C_{15}$ and upwards are favored substrates for transformation wherein the homogeneous noble metal halide catalysts of this invention are employed at sufficiently elevated temperatures and pressures.

H. Hydrogen Halide Agents - As indicated earlier hydrogen halides or sources of hydrogen halides must be present to prepare the acyl halides through the inventive process. The favored agents are hydrogen halides because of cost and availability with the preferred hydrogen halides being hydrogen chlorides and hydrogen bromide in that order of preference.

Insofar as is known at least stoichiometric weight ratios of hydrogen halides to alkenes must be employed with excess ratios being favored.

I. Carbon Monoxide Environment - Insofar as can be determined the best selectivities and conversions of 1-alkenes to acyl halides can be obtained within a reasonable reaction time by using a substantially carbon monoxide gaseous atmosphere. However, particularly in continuous operation, the carbon monoxide may be used in conjunction with from about 0 to 30% by volume of one or more inert gases such as nitrogen, argon, neon and the like without experiencing a substantial decrease in yield and selectivity.

J. Halogenated Solvents - One of the unexpected aspects of the inventive process is that while the formation of acyl halides takes place smoothly in the presence of substantial quantities of halogenated solvents such as methylene chloride, ethylene dichloride, chloroform and their bromo or iodo analogues, carbonylation in the presence of aromatic solvents (such as benzene, toluene) and oxygenated solvents (such as methyl isobutyl ketone, ethers such as dimethoxyethane and p-dioxane) does not lead to the formation of acyl halides, but to undesired by-products.

K. Selectivity as defined herein is the efficiency in catalyzing a desired reaction relative to other undesired reactions. When alpha olefins are to be carbonylated, carbonylation to the linera acyl halide (or linear alkanoyl halide) is the desired conversion. Selectivity is usually expressed as a percentile and is calculated herein by determining the amount of linear acyl halide product formed, divided by the total amount of acyl halide product formed and multiplying the quotient obtained by 100.

L. Conversion as defined herein, is the efficiency in converting the alkene to non-alkene products. Conversion also is expressed as a percentile and is calculated herein by dividing the amount of alkene (olefin) consumed during carbonylation by the amount of alkene (olefin) originally charged and multiplying the quotient by 100.

M. Yield as defined herein, is the efficiency in catalyzing a desired reaction to take place compared to other undesired reactions. In this instance, carbonylation to the acyl halide is the desired conversion. Yield is usually expressed as a percentile and is calculated herein by determining the amount of acyl halide product formed, divided by the amount of acyl halide which can theoretically form, and multiplying the quotient by 100.

N. By-Products - As far as can be determined, without limiting the invention thereby, the novel transformation of alpha alkenes to the linear acyl halides leads to the formation of some branched alkanoyl halide, addition of hydrogen halide to the alkene to produce the alkyl halides, and isomerization of the 1-alkenes to internal olefins. In the latter isomerization, usually less than 10% of the alkene charge is isomerized, mainly to the cis and transforms of the internal olefin. The formation of alkyl halides is the principal side reaction.

O. Identification procedures where applicable are by one or more of the following analytical procedures - gas chromatography (g.c.) infrared, nuclear magnetic resonance and elemental analysis. Unless otherwise specified all percentages are by weight rather than volume and all temperatures are in Centigrade rather than Fahrenheit.

Having described the inventive process in general terms, the following examples are submitted to supply specific and illustrative embodiments.

EXAMPLE 1

Preparation of Octanoyl Chloride from the Carbonylation of 1-Heptene using a Homogeneous Ligand-Stabilized, Palladium-Tin(II) chloride Catalyst 1A. To a reactor provided with agitating, cooling, heating and pressurizing means is added a charge of 75 ml (56g) dichloromethane previously saturated with hydrogen chloride, 0.47g (2.5 mmole) of anhydrous stannous chloride, 0.35g (0.5 mmole) of PdCl$_2$[P(C$_6$H$_5$)$_3$]$_2$ and 7.0 ml (50 mmole) of 1-heptene. All of the charge is added with vigorous agitation and under a blanket of hydrogen chloride to minimize contact with air. After about 15 minutes of agitation, a blood-red solution is obtained containing a small quantity of undissolved catalyst. At the end of this time, the reactor contents are sealed, and pressurized with carbon monoxide to 3000 psig, and heated to 90°C with continued agitation for 3 hours. Then the reaction is terminated by cooling, venting and the 70 ml of reddish brown liquid removed for gas chromatographic (g.c.) analysis. G.C. analysis indicates a 1-heptene conversion of 90 mole %, a yield of C$_8$ acid chloride of 50 mole %, a selectivity to octanoyl chloride of 62 mole %, and 1-heptene isomerization of 8.7 mole %.

1B. Using the same preparative procedure and reaction conditions of 1A the same products are obtained using the following chlorinated paraffinic solvents: chloroform, dichloroethane and trichloroethane.

1C. The same results are obtained when the catalyst is entirely preformed including the stannous chloride complex, and added to the agitated reaction mixture of dichloromethane, hydrogen chloride and 1-heptene, then blanketing with hydrogen chloride, pressurizing with carbon monoxide and heating to 90°C. Isolation procedures are as described above.

EXAMPLES 2 TO 5

Preparation of Other Acyl Halides Using the Homogeneous Palladium(II) Catalyst of Example 1

The same procedure is employed as is disclosed in Example 1, except the following alkenes are replaced on a mmole to mmole basis for 1-heptene.

| Example No. | Alkene | Predominant Product |
|---|---|---|
| 2 | ethylene | propanoyl chloride |
| 3 | propene | butanoyl chloride |
| 4 | 1-dodecene | 1-tridecanoyl chloride |
| 5 | 1-eicosene | 1-heneicosanoyl chloride |

Again dichloromethane is used as the halogenated solvent, hydrogen chloride as the nucleophilic reagent, 90°C is the reaction temperature and 3000 psig is the reaction pressure. Gas chromatographic analysis is used to establish what the predominant products are.

EXAMPLES 6 TO 10

Determination of Reaction Temperatures which can be Utilized in the Preparation of a Typical Alkanoyl Chloride (Octanoyl Chloride) from 1-Heptene, a Typical 1-Alkene In this procedure, 1-heptene is the alkene employed. While the temperature is varied all of the other reaction parameters (shown below) are held constant. Gas chromatographic analysis is used to ascertain the formation of octanoyl chloride product. The procedure of Example 1A is followed.

Catalyst — PdCl$_2$[P(C$_6$H$_5$)$_3$]$_2$—SnCl$_2$
Catalyst concentration — 6.1 × 10$^{-3}$M
Alkene/Pd Mole ratio — 100:1
Reaction Temperatures — 20° to 120°C
Halogenated Solvent — dichloromethane or chloroform (75 ml) saturated at 20°C with hydrogen chloride
Carbon Monoxide Pressure — 3000 psig The data of Table I show operability between 20°C and 120°C, with a preferred range of 60° to 100°C.

EXAMPLES 11 TO 12

Determination of Reaction Pressures which can be Utilized in the Preparation of a Typical Alkanoyl Chloride (Octanoyl Chloride) from 1-Heptene, a Typical 1-Alkene and Another Pd Catalyst In these runs 1-heptene is the 1-alkene employed. The reaction is run at 80°C keeping other reaction parameters constant as shown below. The procedure is that of Example 1A.

Catalyst — $PdCl_2[P(p—CH_3.C_6H_4)_3]_2—SnCl_2$
Catalyst concentration — $6.1 \times 10^{-3}M$
Alkene/Noble Metal Mole Ratio — 100:1
Halogenated Solvent — dichloromethane (75 ml) saturated at 20°C with hydrogen chloride.

The data of Table I show operability at pressures between 100 psig and 3000 psig with a preferred range of 1000 to 3000 psig of CO.

EXAMPLES 13 TO 16

Determination of the Effect of 1-Heptene and Noble Metal Catalyst Concentrations in the Preparation of Octanoyl Chloride from 1-Heptene Table II shows data obtained when the $PdCl_2[P(C_6H_5)_3]_2—SnCl_2$ catalyst system is employed for the synthesis of octanoyl chloride from 1-heptene using the procedure set forth in Example IA, but with the designated concentrations of 1-heptene and palladium catalyst.

EXAMPLES 17 AND 18

Preparation of Octanoyl Bromide from the Carbonylation of 1-Heptene Using a Homogeneous Ligand-Stabilized Palladium(II)-Tin(II) Bromide Catalyst The preparative procedure reaction conditions and reactants employed in Example 1A is followed except that in Run 17, 75 ml of dibromomethane saturated with HBr is used to replace dichloroethane saturated with HCl, and in Run 18, dibromoethane is saturated with HBr, and $PdBr_2[P(p—CH_3O.C_6H_4)_3]_2-SnBr_2$ is the catalyst used. Gas chromatographic analysis confirms the presence of the expected octanoyl bromide product.

EXAMPLES 19 TO 27

Determination of the Effect of Noble Metal Catalyst Composition in the Preparation of Octanoyl Chloride from 1-Heptene The ability to catalytically transform 1-heptene to octanoyl chloride by the carbonylation of 1-heptene is evaluated in these runs, which are summarized by Table III, for various noble metal halide-Group IVB metal halide complexes solubilized in various halogenated, aromatic and oxygenated solvents. The operating procedure is that of Example 1A.

TABLE I

OCTANOYL CHLORIDE SYNTHESIS FROM 1-HEPTENE

| EXAMPLE | CATALYST | TEMP.(°C) | PRESSURE (PSIG) | 1-HEPTENE CONVERSION (%) | OCTANOYL CHLORIDE YIELD(MOLE %) | OCTANOYL CHLORIDE SELECTIVITY(%) |
|---|---|---|---|---|---|---|
| 6 | $PdCl_2[P(C_6H_5)_3]_2—SnCl_2$ | 20 | 3000 | 68 | 12 | 48 |
| 7 | " | 60 | " | 35 | 15 | 64 |
| 8 | " | 80 | " | 92 | 25 | 66 |
| 9 | " | 100 | " | 74 | 29 | 66 |
| 10 | " | 120 | " | 52 | 19 | 69 |
| 11 | $PdCl_2[P(p—CH_3.C_6H_4)_3]_2—SnCl_2$ | 80 | 100 | 48 | 5.4 | 83 |
| 12 | " | " | 1000 | 67 | 20 | 68 |

TABLE II

OCTANOYL CHLORIDE SYNTHESIS FROM 1-HEPTENE

| EXAMPLE | [1-HEPTENE] (M) | [Pd](M) | 1-HEPTENE CONVERSION(%) | OCTANOYL CHLORIDE YIELD(MOLE %) | SELECTIVITY(MOLE %) |
|---|---|---|---|---|---|
| 13 | 0.32 | $6.4 \times 10^{-3}$ | 100 | 24 | 52 |
| 14 | 0.61 | $6.1 \times 10^{-3}$ | 92 | 25 | 66 |
| 15 | 0.61 | $3.0 \times 10^{-3}$ | 91 | 29 | 68 |
| 16 | 0.61 | $1.2 \times 10^{-4}$ | 37 | 6.1 | 72 |

TABLE III

OCTANOYL CHLORIDE SYNTHESIS FROM 1-HEPTENE[1]

| EXAMPLE | CATALYST | SOLVENT | 1-HEPTENE CONVERSION(%) | OCTANOYL CHLORIDE YIELD(MOLE %) | SELECTIVITY(%) |
|---|---|---|---|---|---|
| 19 | $PdCl_2[P(C_6H_5)_3]_2—SnCl_2$ | $CH_2Cl_2$ | 92 | 25 | 66 |
| 20 | " | $CHCl_3$ | 69 | 21 | 61 |
| 21 | " | $C_6H_6$ | 49 | NONE | — |
| 22 | " | MIBK[2] | 25 | NONE | — |
| 23 | $PdCl_2[P(p—CH_3—C_6H_4)_3]_2—SnCl_2$ | $CH_2Cl_2$ | 67 | 20 | 67 |
| 24 | $PdCl_2[P—pCH_3O—C_6H_4)_3]_2—SnCl_2$ | " | 44 | 15 | 58 |
| 25 | $PtCl_2[As(C_6H_5)_3]_2—SnCl_2$ | " | 68 | 9.1 | 86 |
| 26 | $PtCl_4—SnCl_2$ | " | 89 | 10 | 73 |
| 27 | $PdCl_2[P(C_6H_5)_3]_2—GeCl_2$ | " | 77 | 26 | 84 |

1. Run Conditions: [Catalyst] = $6.1 \times 10^{-3}M$, [1-Heptene]/[Noble Metal] = 100
Reaction Temp. = 80°C, Reaction Time = 360 Min(excluding heat-up and cooling times).
2. MIBK - Methyl Isobutyl Ketone Table III in conjunction with the previous disclosure establishes the following;

1. That three classes of homogeneous palladium(II), platinum(II) and platinum(IV) halides in combination with Group IVB halides, are active catalysts for acyl halide synthesis.

2. Halogenated alkyl solvents combined with HCl nucleophilic agents are required for acyl chloride preparation.

3. Replacement of halogenated solvents with aromatic or oxygenated solvents such as ketones precludes the preparation of the acyl (or alkanoyl) chloride products.

As the numerous examples and preceding commentary have established, several advantages arise from the practice of this invention.

For instance, a relatively large group of homogeneous palladium and platinum catalysts have been disclosed which have not been known to have catalytic activity in the synthesis of acyl (or alkanoyl) halide from alkene substrates. These catalyst compositions offer the further advantage of being readily available by well know preparative procedures, but show good selectivity and function well at high alkene substrate to catalyst ratios.

Quite unexpectedly it has been found that while the carbonylation process proceeds well in halogenated alkyl solvents, little or no acyl halide is produced when aromatic or oxygenated solvents are employed. This result is contrary to other types of transformations employing the same types of catalysts.

Other advantages that the inventive process offers are rapid rates of reaction, batch or continuous operation, good selectivity and consistently high conversions. Finally, a relatively flexible process is herein disclosed and claimed. That is, numerous changes, substitutions and modifications may be made without departing from the inventive concept. The metes and bounds of this invention are best determined by reading the claims which follow in light of the preceding disclosure.

What is claimed is:

1. A process for catalytically transforming alkene substrates containing 2 and more carbon atoms and only one carbon to carbon double bond, to acyl halides containing one more carbon atom than the alkene substrate by:

a. admixing under a deoxygenated environment, each mole of alkene substrate to be transformed to acyl halides with at least a stoichiometric quantity of hydrogen halide, and at least a catalytic quantity of a homogeneous noble metal catalyst composition selected from the group consisting of: $PdCl_2]P(p-CH_3-C_6H_4)_3]_2-SnCl_2$, $PdCl_2[P(C_6H_5)_3]_2-SnCl_2$, $PdBr_2[P(p-CH_3O.C_6H_4)_3]_2-SnBr_2$, $PdCl_2[P(p-CH_3O-C_6H_4)_3]_2-SnCl_2$, $PtCl_2[As(C_6H_5)_3]_2-SnCl_2$, $PtCl_4-SnCl_2$ and $PdCl_2[P(C_6H_5)_3]_2-GeCl_2$, said catalysts being solubilized in a halogenated paraffinic solvent, until a deoxygenated reaction mixture is formed, and b. heating said admixed, deoxygenated reaction mixture between about 20° and 120°C while said mixture is under superatmospheric pressure by at least stoichiometric quantities of carbon monoxide, until said acyl halides are produced.

2. A process for carbonylating 1-alkene substrates containing from 2 to 20 carbon atoms to acyl chlorides containing one more carbon atom than said 1-alkene by:

a. admixing under a deoxygenated environment each mole of said substrate to be carbonylated with a stoichiometric excess of a hydrogen halide and from 0.005 to 0.02 moles of a homogeneous noble metal catalyst composition selected from the group consisting of $PdCl_2[P(p-CH_3-C_6H_4)_3]_2-SnCl_2$, $PdCl_2[P(p-CH_3O-C_6H_4)_3]_2-SnCl_2$, $PtCl_2[As(C_6H_5)_3]_2-SnCl_2$ and $PtCl_4-SnCl_2$ and sufficient chlorinated paraffinic solvent to solubilize said catalyst composition, until a deoxygenated reaction mixture is formed, b. heating said reaction mixture between about 60°C and 100°C, while under superatmospheric pressures ranging from 1000 to 3000 psig of carbon monoxide until said acyl chloride is formed, and c. isolating said acyl chloride contained therein.

3. The process of claim 2 wherein the chlorinated paraffinic solvent is saturated with hydrogen chloride prior to addition of the 1-alkene.

4. The process of claim 2 wherein the catalyst is $PdCl_2[P(p-CH_3C_6H_4)_3]_2-SnCl_2$.

5. The process of claim 2 wherein the catalyst is $PtCl_2[As(C_6H_5)_3]_2-SnCl_2$.

6. The process of claim 1 wherein the catalyst is $PdCl_2[P(C_6H_5)_3]_2-GeCl_2$.

7. The process of claim 1 wherein the substrates are in the form of a mixture.

8. The process of claim 7 wherein the mixture is of 1-alkenes containing 5 to 15 carbon atoms.

* * * * *